US012529780B2

(12) United States Patent
Makhoul et al.

(10) Patent No.: US 12,529,780 B2
(45) Date of Patent: Jan. 20, 2026

(54) METHOD AND DEVICE FOR DETERMINING THE RELATIVE PERMITTIVITY OF A MATERIAL USING A GROUND-PENETRATING RADAR

(71) Applicant: COMMISSARIAT A L'ENERGIE ATOMIQUE ET AUX ENERGIES ALTERNATIVES, Paris (FR)

(72) Inventors: Gloria Makhoul, Grenoble (FR); Raffaele D'Errico, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 290 days.

(21) Appl. No.: 18/520,406

(22) Filed: Nov. 27, 2023

(65) Prior Publication Data

US 2024/0176012 A1    May 30, 2024

(30) Foreign Application Priority Data

Nov. 28, 2022    (FR) ...................................... 2212411

(51) Int. Cl.
*G01S 13/88*    (2006.01)
*G01S 13/02*    (2006.01)
*G01S 13/42*    (2006.01)

(52) U.S. Cl.
CPC ............ *G01S 13/885* (2013.01); *G01S 13/42* (2013.01); *G01S 2013/0245* (2013.01)

(58) Field of Classification Search
CPC .......... G01S 13/885; G01S 7/411; G01V 3/12
See application file for complete search history.

(56) References Cited

U.S. PATENT DOCUMENTS 6,246,354 B1 *   6/2001   Liedtke .................... G01V 3/12
                                                              342/22
2002/0175849 A1 * 11/2002 Arndt ..................... F41H 11/12
                                                             342/194

FOREIGN PATENT DOCUMENTS

JP    2019219348 A   * 12/2019

OTHER PUBLICATIONS

Serkan, et al., "Estimation methods for obtaining GPR signal velocity", Proceedings of the Third International Conference on ACSEE, 2015.
Forte, et al., "Review of multi-offset GPR applications: Data acquisition, processing and analysis", Signal processing, 132, pp. 210-220, 2017.
Schneider, "Developments in seismic data processing and analysis (1968-1970)", Geophysics. vol. 36, No. 6, pp. 1043-1073, 1971.

(Continued)

*Primary Examiner* — Vladimir Magloire
*Assistant Examiner* — Peter Davon Doze
(74) *Attorney, Agent, or Firm* — BakerHostetler

(57) ABSTRACT

A new method for accurately estimating the relative permittivities and the thicknesses of each layer of a material such as the ground is provided. The method is based on acquisitions of measurements taken by a ground-penetrating radar provided with a plurality of transmitting antennas and a plurality of receiving antennas (multiple input multiple output or MIMO radar). The proposed method is based on a particular algorithm that aims to estimate the most probable (delay, relative permittivity) pairs that correspond to the different layers making up the structure of the ground.

16 Claims, 4 Drawing Sheets

(56) References Cited

OTHER PUBLICATIONS

Grote, et al., "GPR monitoring of volumetric water content in soils applied to highway construction and maintenance", The Leading Edge, vol. 21, No. 5, pp. 482-504, 2002.

Özdemir, et al., "A review on migration methods in B-scan ground penetrating radar imaging", Mathematical Problems in Engineering 2014 (2014).

Dong, et al., "3D Migration Depth Focus Velocity Analysis of Hand-Held Ground Penetrating Radar", Geosciences, vol. 12, No. 4, 178, 2002.

Cramer, "Evaluation of an ultrawide-band propagation channel", IEEE Transactions on Antennas and Propagation, vol. 50, No. 5, pp. 561-570, 2002.

Schwarz, "Mathematical-statistical description of the iterative beam removing technique (method clean)," Astronomy and Astrophysics, vol. 65, pp. 345-356, 1978.

Walia, et al., "Reviewing methods for determination of Dielectric Constant required to Calibrate GPR Study for Asphalt Layers", IOP Conference Series: Materials Science and Engineering, vol. 1075, p. 012026, 2021.

Spagnolini, "Permittivity measurements of multilayered media with monostatic pulse radar", IEEE Transactions on Geoscience and Remote Sensing, vol. 35, Issue: 2, pp. 454-463, Mar. 1997.

Wang, et al., "Deep-Learning-Based Method for Estimating Permittivity of Ground-Penetrating Radar Targets", Remote Sens., vol. 14, No. 17, p. 4293, 2022.

Zhang, et al., "MIMO Ground Penetrating Radar Imaging Through Multilayered Subsurface Using Total Variation Minimization", IEEE Transactions on Geoscience and Remote Sensing, vol. 57, Issue: 4, pp. 2107-2115, Apr. 2019.

\* cited by examiner

METHOD AND DEVICE FOR DETERMINING THE RELATIVE PERMITTIVITY OF A MATERIAL USING A GROUND-PENETRATING RADAR

CROSS-REFERENCE TO RELATED APPLICATION

This application claims priority to foreign French patent application No. FR 2212411, filed on Nov. 28, 2022, the disclosure of which is incorporated by reference in its entirety.

FIELD OF THE INVENTION

The invention relates to the field of ground-penetrating radars and more specifically to non-destructive devices and methods for characterizing the composition of the ground or more generally of a material.

The invention relates more specifically to a method and a device for determining the dielectric properties of the ground, in other words the relative permittivities and the thicknesses of the different layers that make up the ground. This information then makes it possible to improve radar detection techniques in order to locate and identify underground targets such as ducts, pipes or even mines, or more generally any type of object buried in the ground or in any type of material.

BACKGROUND

Methods for detecting buried targets using a ground-penetrating radar are generally based on algorithms that require, in their parameters, an accurate estimate of the relative permittivities of the different layers of the ground. In general, this information is not known, or is broadly estimated in the form of a mean value for the overall structure of the ground. These approximations can increase the uncertainties about the results of the detection and characterization of the underground targets.

There is therefore a need for a method for accurately estimating the relative permittivities of the different layers of the ground and the thicknesses thereof so that this information can subsequently be used to improve the algorithms for detecting targets using ground-penetrating radars.

Hereinafter, the invention is described in the context of the detection of targets buried in the ground, but the invention applies more generally to targets buried in any type of material, which can be different from the ground. The invention also applies to medical imaging using microwaves for detecting veins under the skin, for example, or to non-destructive testing using microwaves for estimating the thickness of concrete layers of an industrial structure.

Several methods for estimating permittivity have been proposed over the years, using data from ground-penetrating radars (GPRs), for example references [1-2]. Most of these techniques are similar to the velocity analysis approaches used in processing seismic data as described in [3]. Each of these methods depends to a certain extent on the comparison of known measurements with data acquired by a ground-penetrating radar (GPR). The two most commonly used prior art methods are hyperbolic curve-fitting and migration.

The first known method is based on hyperbolic curve-fitting. When the antenna of the ground-penetrating radar is moved over the surface of the ground and the penetrating wave encounters buried targets or interfaces between different layers of the ground, hyperbolas can be formed by the travel times of the reflected waves over the distance travelled by the radar. The shape of each hyperbola is given mainly on the basis of two elements: the design of the radar, particularly the geometric arrangement of the antennas, and the dielectric properties of the propagation medium. The shape of the radar system is static but the target portion illuminated by the radar increases with the depth, and the contour of the curve thus changes with the depth. The shape of each individual hyperbola therefore depends on the depth and the dielectric properties of the medium. If the target depth is known, the mean dielectric properties of the medium can be estimated by fitting a digital curve to the contour of the hyperbola in the data as described in reference [4]. This is a very common method of calibrating GPR data; however, this method can have two potential defects. The first drawback is that the data acquired must contain several hyperbolas that are sufficiently clear for known target depths for this method to be used. The other potential problem is that there is generally a small range of values that corresponds to the same hyperbola contour. This last problem can however be refined with greater accuracy by using a mathematical technique known by the name of migration and described in reference [5].

Migration is a form of mathematical processing the main aim of which is to define linear objects more accurately. Correctly applied, the process reduces the hyperbolas to a data point acquired by the radar. For linear objects, this makes their position and depth much easier to define as it is no longer necessary to use the complete hyperbola. There is a wide variety of different migration methods, including the one described in reference [5]. The main parameter required to reduce the hyperbola to a point corresponds to the dielectric properties of the ground, as disclosed in reference [6]. This makes the migration process a means of increasing the accuracy of the curve fitting as the process only works correctly if the ground transmission velocity applied is accurate.

Generally, the prior art methods use a mean estimate of the relative permittivity of a material for a given depth.

One drawback of these methods is their relative inaccuracy when the material, particularly the ground, is made up of several layers with different permittivities.

SUMMARY OF THE INVENTION

The invention proposes a new method for accurately estimating the relative permittivities and the thicknesses of each layer of a material such as the ground.

The method is based on acquisitions of measurements taken by a ground-penetrating radar provided with a plurality of transmitting antennas and a plurality of receiving antennas (multiple input multiple output or MIMO radar).

The proposed method is based on a particular algorithm that aims to estimate the most probable (delay, relative permittivity) pairs that correspond to the different layers making up the structure of the ground.

The invention relates to a method for determining the relative permittivity of a material, comprising the steps of:
  Acquiring a set of measurements using a ground-penetrating radar provided with NTx transmitting antennas and NRx receiving antennas arranged in a plane parallel to the surface of the material, where NTx and NRx are two positive integers at least equal to two, the set of measurements consisting of impulse responses for each pair consisting of a transmitting antenna and a receiving antenna, Extracting, from each impulse response, the components relating to multiple paths of the radar signal, in the form of a vector giving the amplitude of the signal as a function of different delay values corresponding to different paths, Estimating, for each transmitting antenna, a coordinate, in the plane of the radar, of each target associated with a path by finding the coordinate of the receiving antenna that maximizes the impulse response, Calculating, for a plurality of assumed relative permittivity values of the material, an estimated delay of the radar signal from a hyperbolic curve model defined by the characteristics of the radar and the coordinates of the target associated with a path of the signal, Finding, in all of the components extracted from the impulse responses, for each pair consisting of a transmitting antenna and a receiving antenna, at least one amplitude associated with a delay closest to the estimated delay calculated in the previous step, Calculating, for each transmitting antenna, a coefficient of correlation of said amplitudes on all of the receiving antennas, Iterating the previous three steps for a plurality of relative permittivity values of the material, Iterating the previous four steps for all of the delay values corresponding to multiple paths of the radar signal in order to obtain NTx correlation matrices giving, for each relative permittivity value of the ground and delay value pair, a correlation coefficient value, Eliminating the values of the correlation matrices for which the correlation coefficient is less than a predetermined detection threshold, Filtering the remaining values so as to retain just one vector containing a set of delay values that are all different and an associated relative permittivity value of the ground, Deducing therefrom, for each layer of the ground, an estimate of its relative permittivity and thickness.

According to a particular aspect of the invention, the step of extracting, from each impulse response, the components relating to multiple paths of the radar signal, is carried out using a high-resolution algorithm.

According to a particular aspect of the invention, the step of calculating an estimated delay t of the radar signal is carried out using the following hyperbolic equation:

$$t = \frac{1}{v_g}\left[\sqrt{(x_{Tx_j} - x_{c_p})^2 + \left(\frac{\Delta y}{2}\right)^2 + \left(\frac{v_g \tau_p}{2}\right)^2} + \sqrt{(x_{Rx_i} - x_{c_p})^2 + \left(\frac{\Delta y}{2}\right)^2 + \left(\frac{v_g \tau_p}{2}\right)^2}\right]$$

Where $x_{c_p}$ is the estimated coordinate of the target, $x_{Tx_j}$ is the coordinate of each transmitting antenna, $x_{Rx_i}$ is the coordinate of each receiving antenna, $\Delta y$ is the distance between a transmitting antenna and a receiving antenna, $v_g$ is the mean propagation velocity of the signal in the material, and $\tau_p$ is the value of an estimated delay.

According to a particular aspect of the invention, the step of finding at least one amplitude associated with a delay closest to the estimated delay calculated in the previous step is carried out by:

Finding, for each pair consisting of a transmitting antenna and a receiving antenna, the amplitude $a_{ip}$ associated with the delay closest to the estimated delay calculated, Defining a time window of N+1 samples, N being a positive integer at least equal to 1, the window being centred on the amplitude selected in the previous step, and selecting N/2 amplitude values corresponding to the delay values contained in the time window.

According to a particular aspect of the invention, the correlation coefficient is calculated using the following relation:

$$R(t, \varepsilon_r) = \frac{\sum_{p_j=p-N/2}^{p+N/2}\left[\sum_{i=1}^{NRx} a_{ip_j}\right]^2}{M \sum_{p_j=p-N/2}^{p+N/2} \sum_{i=1}^{NRx} a_{ip_j}^2}$$

where $a_{ip}$ is the amplitude associated with the delay closest to the estimated delay calculated, p is the index of said delay, $a_{ip_j}$ is the amplitude corresponding to the time index $p_j$ in said time window, and $\varepsilon_r$ is the assumed relative permittivity value.

According to a particular embodiment of the invention, the value of the threshold is in the interval ]0.5; 1[.

According to a particular aspect of the invention, the step of filtering the remaining values comprises the sub-steps of:

Selecting the pairs that have substantially the same delay values for all of the transmitting antennas, Ordering the pairs according to the value of the delays, When several consecutive relative permittivity values are substantially equal, retaining only the pair having the highest delay value.

According to a particular aspect of the invention, when several pairs have substantially the same delay values for all of the transmitting antennas but different relative permittivity values, only the relative permittivity value that maximizes the correlation coefficient is retained.

According to a particular aspect of the invention, the step of deducing, for each layer of the material, an estimate of its relative permittivity and its thickness, comprises the sub-steps of:

Estimating the apparent depth of each layer from each pair of delay and relative permittivity values, Iteratively determining the relative permittivity of each layer by applying the Dix equation to the delay and propagation velocity values, derived from the relative permittivity value, Determining the thickness of each layer from the delay and propagation velocity values.

According to a particular aspect of the invention, during the step of iteratively determining the relative permittivity of each layer, when two consecutive paths lead to obtaining an imaginary propagation velocity, the path with the lowest correlation factor of the two paths is eliminated.

According to a particular aspect of the invention, the material is multi-layer and the method comprises a prior phase of estimating the relative permittivity of the first layer of the material for which the hyperbolic curve model for the first layer of the material is a linear asymptotic model and the prior phase comprises:

a step of identifying the path corresponding to the first layer as the path that maximizes the correlation coefficient, selecting the relative permittivity associated with said path as corresponding to the first layer, calculating the thickness of the first layer from the delay and relative permittivity values associated with the path.

According to a particular aspect of the invention, the detection threshold used for the first layer during the prior phase has a lower value than the detection threshold used for the subsequent layers.

According to a particular aspect of the invention, the material is the ground.

The invention also relates to a device for determining the relative permittivity of a material comprising a ground-penetrating radar provided with NTx transmitting antennas and NRx receiving antennas and a processing unit configured to implement the steps of the method according to the invention.

The invention also relates to a computer program comprising code instructions that cause the device according to the invention to execute the steps of the method according to the invention together with a computer-readable medium on which the computer program according to the invention is stored.

BRIEF DESCRIPTION OF THE DRAWINGS

Further features and advantages of the present invention will become more clearly apparent on reading the following description with reference to the following appended drawings.

DETAILED DESCRIPTION

Figure 1:
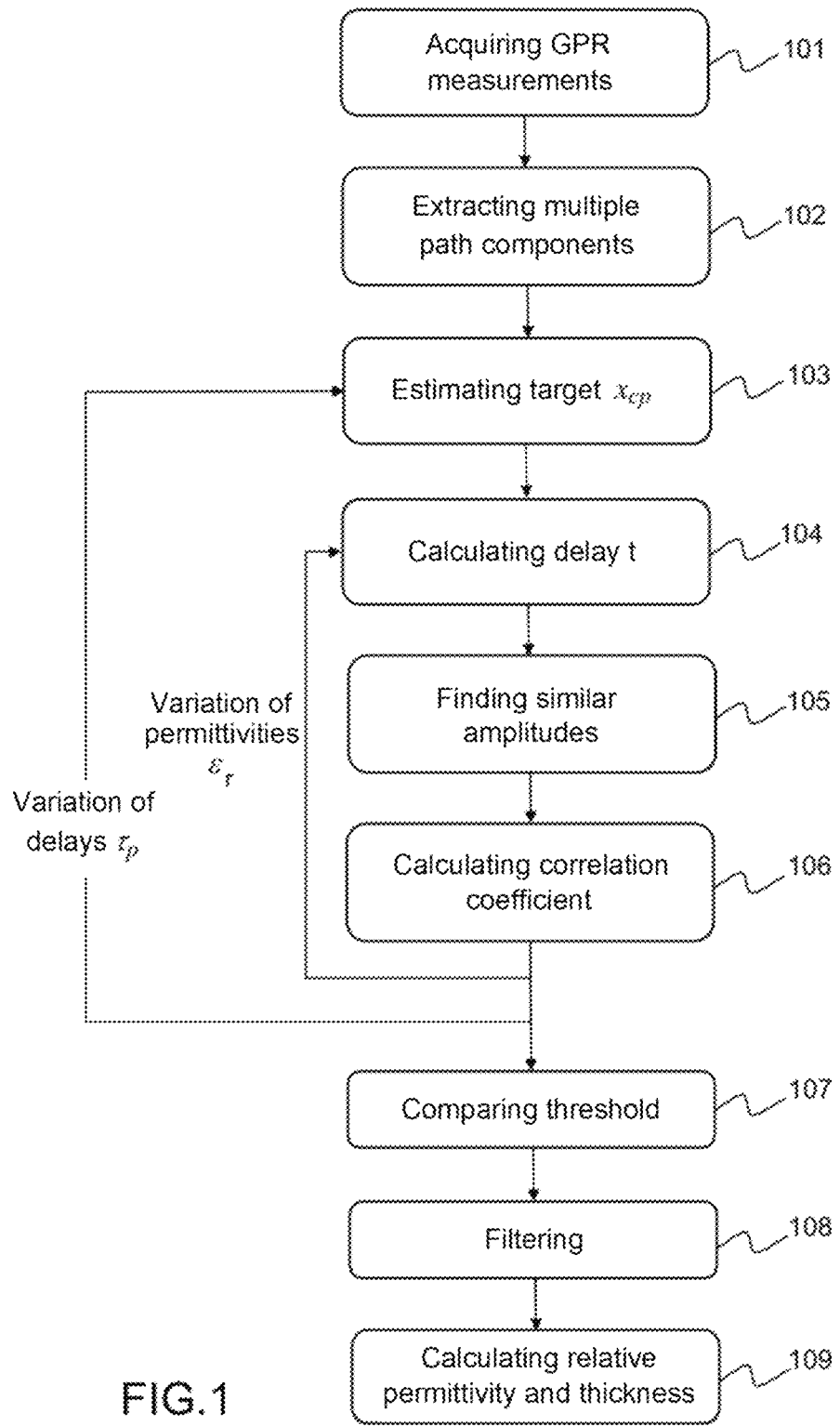
FIG. 1 shows a flow chart detailing the steps of implementing a method for determining the permittivity of the ground according to one embodiment of the invention.

FIG. 1 shows, on a flow chart, the steps of implementing a method for determining dielectric properties of the ground according to a first embodiment of the invention.

This first embodiment advantageously applies when the thickness of the first layer of the ground is sufficiently large with respect to the time resolution of the radar, which depends on its operating carrier frequency.

Figure 2A:
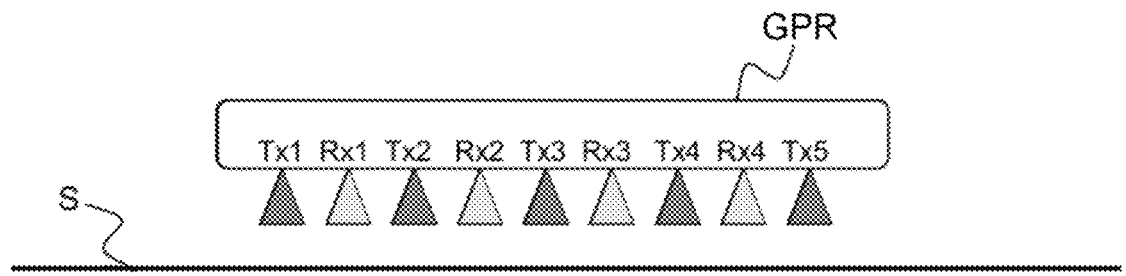
FIG. 2a shows a first diagram of a multi-antenna ground-penetrating radar.

The first step 101 consists of acquiring a set of measurements using a ground-penetrating radar having NTx transmitting antennas and NRx receiving antennas, where NTx and NRx are positive integers at least equal to 2. FIG. 2a schematically shows an example of a ground-penetrating radar having five transmitting antennas and four receiving antennas and moving over the surface of the ground S, making several successive time acquisitions.

Figure 2B:
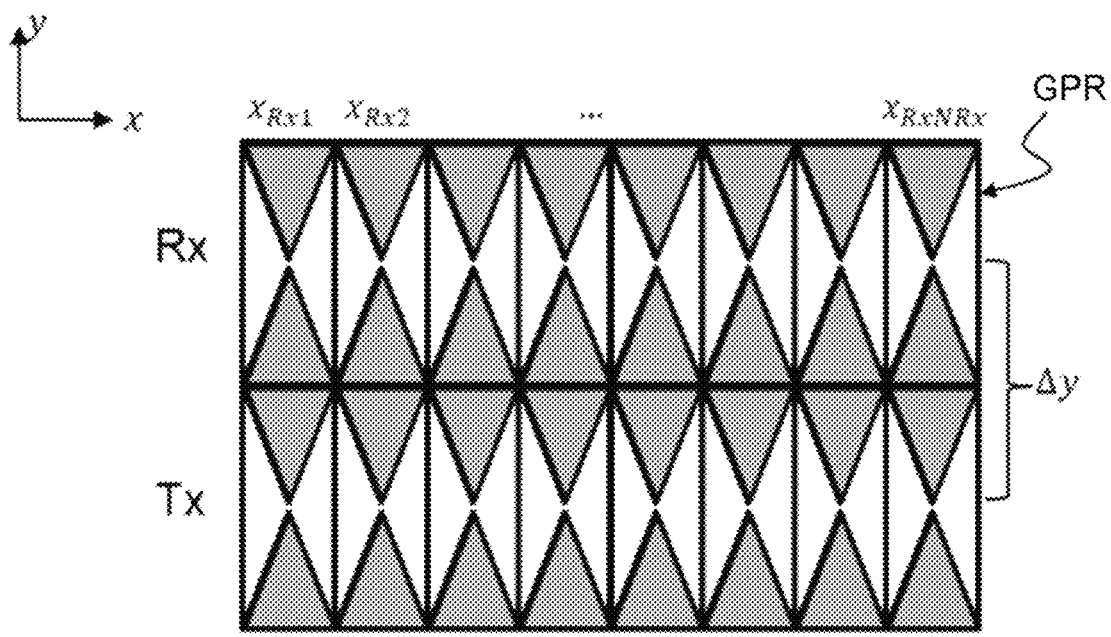
FIG. 2b shows a second diagram of a multi-antenna ground-penetrating radar.

FIG. 2b shows a top view of another example of a ground-penetrating radar in a plane (x, y) parallel to the plane of the ground. The NRx receiving antennas are each arranged at a fixed distance $\Delta y$ from the NTx transmitting antennas. Each transmitting antenna has a coordinate $x_{Rxi}$ along the x-axis and is separated by a distance $\Delta y$ from a corresponding receiving antenna along the y-axis.

Other arrangement geometries of the antennas of the radar can be envisaged without departing from the scope of the invention. In any case, the ground-penetrating radar is arranged close to the ground so as to operate in near-field.

The step 101 of acquiring radar measurements thus consists of moving the ground-penetrating radar over the surface of the ground S to be analysed and measuring, for each pair associating a transmitting antenna and a receiving antenna, an impulse response of the radar signal $h(Rx_i, Tx_j, \tau)$, where $Rx_i$ denotes a receiving antenna, $Tx_j$ denotes a transmitting antenna and t denotes the time delay. In other words, the impulse response gives the amplitude values as a function of the delay $\tau$.

The impulse responses can be organized in the form of a number NTx of vectors of dimension NRx.

In step 102, a method for extracting the components relating to multiple paths is then applied to the impulse responses. For example, the method used is the CLEAN method or a high-resolution method or any other appropriate method.

The aim of step 102 is to detect multiple paths of the signal that correspond to reflections from buried targets. Each path is characterized by a delay $\tau_p$ and an amplitude $|h(Rx_i, Tx_j, \tau_p)|$.

In one particular embodiment of step 102, the CLEAN method is applied using a rectangular filter that is defined by a number of samples the amplitudes of which are forced to zero around the local maximum detected. An approach known as "beamwidth filter" consists of finding the closest local minimums around the local maximum detected, then forcing the sample forming the impulse detected to zero. Examples of the implementation of the CLEAN method are given in references [7] and [8].

Following step 102, a 2D matrix of dimension NP by NRx is obtained for each transmitting antenna $Tx_j$, giving the values of the amplitudes of each path $\tau_p$ detected for each receiving antenna $Rx_i$, where NP is the number of paths detected.

The following steps 103, 104 consist of modelling each path of the signal using a hyperbolic curve that depends on the geometry of the radar, the dielectric properties of the ground and the position of the targets from which the paths of the signal are reflected.

An example of a path modelled by a hyperbolic curve is given by the following equation (1):

$$t = \frac{1}{v_g}\left[\sqrt{(x_{Tx_j} - x_{c_p})^2 + \left(\frac{\Delta y}{2}\right)^2 + \left(\frac{v_g \tau_p}{2}\right)^2} + \sqrt{(x_{Rx_i} - x_{c_p})^2 + \left(\frac{\Delta y}{2}\right)^2 + \left(\frac{v_g \tau_p}{2}\right)^2}\right] \quad (1)$$

$v_g$ is the propagation velocity of the signal towards a point of a layer of the ground that is linked to the mean relative permittivity $\varepsilon_r$ of the medium forming the layer of the ground by the equation (2):

$$v_g = \frac{c}{\sqrt{\varepsilon_r}} \quad (2)$$

c is the velocity of light in free space $\Delta y$ is the distance, along the y-axis in FIG. 2b, between a transmitting antenna and a receiving antenna $\tau_p$ is the delay associated with the path of index p $x_{c_p}$ is the abscissa, along the x-axis in FIG. 2b, of the target associated with the path of index p $x_{Tx_j}$ and $x_{Rx_i}$ are the respective abscissas of the transmitting and receiving antennas.

The equation (1) that models a hyperbolic curve can be adapted depending on the geometry of the radar without departing from the scope of the invention.

In step 103, an estimated coordinate $x_{c_p}$ of the target is first determined by finding, for each transmitting antenna and each path of index p, the coordinate of the receiving antenna that maximizes the impulse response determined in step 102:

$$x_{cp} = \arg\max_{x_{Rxi}} |h(Rx_i, Tx_j, \tau_p)| \quad (3)$$

Then, in step 104, equation (1) is applied in order to estimate the delay t modelled on the basis of a hyperbolic curve, for different assumed relative permittivity values $\varepsilon_r$ and for all of the receiving antennas.

In step 105, the amplitude $a_{ip}$ associated with the delay $\tau_p$ that is closest to the delay t calculated in step 104 is then found, for each receiving antenna, in the impulse responses. In other words, the index p that minimizes the difference between t and $\tau_p$ is retained from all of the delays detected for a receiving antenna.

In other words, by using $\tau_p$ and $x_{c_p}$ for a given permittivity, step 104 consists of calculating a vector of delays t of dimension equal to the number of receiving antennas NRx. This vector has the shape of the hyperbola formed by a target of delay $\tau_p$ and $x_{c_p}$.

This hyperbola must then be found in the measurement data. To this end, the amplitudes corresponding to the vector t ([1×NRx]=[t1 t2 t3 tNRx]) are found in the data $h(x_{Txi}, x_{Rxj}, t)$.

Sometimes the values of t cannot be found identically in the measurements. In this case, there are two possible options. A first option consists of finding the delay $\tau_p$ closest to t and selecting the corresponding amplitude.

Another option consists of carrying out an interpolation on the amplitude obtained for the delay $\tau_p$ in order to estimate the value of the amplitude corresponding to the delay t.

In one particular embodiment of step 105, several amplitudes are retained in a time window of dimension N+1 around the amplitude $a_{ip}$ associated with the delay $\tau_p$ that is closest to the delay t.

In step 106, a correlation coefficient, also known as a similarity metric, is then calculated with the aim of estimating the degree of similarity between the amplitudes determined in step 105 on all of the receiving antennas. The aim of step 105 is to identify whether the amplitudes of the path retained are substantially identical for all of the receiving antennas, which should normally be the case if the path is correctly estimated.

The correlation coefficient is for example determined using the following relation:

$$R(t, \varepsilon_R) = \frac{\sum_{p_j=p-N/2}^{p+N/2} \left[\sum_{i=1}^{NRx} a_{ip_j}\right]^2}{M \sum_{p_j=p-N/2}^{p+N/2} \sum_{i=1}^{NRx} a_{ip_j}^2} \quad (4)$$

M is a normalization factor dimensioned so that the correlation coefficient is equal to 1 when all of the amplitudes are the same and tends towards 0 when they are significantly different.

As stated, in one embodiment, N is taken as equal to 0 and the relation (4) is simplified to:

$$R(t, \varepsilon_R) = \frac{\left[\sum_{i=1}^{NRx} a_{ip_j}\right]^2}{M \sum_{i=1}^{NRx} a_{ip_j}^2}$$

Other metrics can be used to calculate a similarity coefficient without departing from the scope of the invention.

Steps 104 to 106 are iterated for all of the relative permittivity assumptions. Steps 103 to 106 are iterated for all of the delay indices p.

At the end of these steps, NTx correlation matrices are obtained, also known as coherence matrices, of dimensions NP by NE, where NP is the number of delays and NE is the number of relative permittivity assumptions. The values of a correlation matrix are the correlation coefficients $R(t,\varepsilon_r)$ for each delay, relative permittivity pair.

Then in step 107, all of the values of the NTx correlation matrices are compared with a predetermined detection threshold th1 the value of which is in the interval ]0.5; 1[.

Only the values that exceed this threshold are retained. A high value of the threshold th1 makes it possible to be more selective in order to eliminate a larger number of values. Conversely, a lower value can be chosen when the hyperbolic curve model has more uncertainties.

Following step 107, a 3D matrix (delay, relative permittivity and correlation coefficient) is obtained of dimensions NP' by NTx by NE' where NP' and NE' respectively correspond to the maximum numbers of paths and permittivity assumptions for each transmitting antenna.

The matrix obtained is in the following form, in which each column represents the significant events detected by all of the receiving antennas for a single transmitting antenna.

$$A = \begin{pmatrix} \alpha_{11} & \cdots & \alpha_{1NTx} \\ \vdots & \ddots & \vdots \\ \alpha_{NP'1} & \cdots & \alpha_{NP'NTx} \end{pmatrix}$$

Where $\alpha_{pi}$ is a 2D matrix in the form:

$$\alpha_{pi} = \begin{pmatrix} \tau_{pi} & \varepsilon_{p1} & R(\varepsilon_{p1}, \tau_{pi})_{p1} \\ \vdots & \ddots & \vdots \\ \tau_{pi} & \varepsilon_{pNE'} & R(\varepsilon_{pNE'}, \tau_{pi})_{pNE'} \end{pmatrix}$$

Each entry of the first column of this matrix contains the same delay value $\tau_{pi}$, the second column contains the different relative permittivity values retained and the third column contains the correlation coefficient values associated with the delay, permittivity pair.

Step 108 then consists of filtering the values of matrix A so that just one vector of delay, permittivity pairs is retained, for which all of the delay values are different.

To this end, step 108 consists firstly of retaining the multiple paths common to the different transmitting antennas. Each path is defined by a (delay, relative permittivity) pair. The common paths are those that have similar delays based on a given error criterion. The difference between two delays is compared as an absolute value to an error threshold that depends on the scenario in question and in particular on the speed of travel of the radar during its movement in the acquisition step 101, but also on the size of the network of antennas. When several common paths are detected that have substantially the same delay value but different relative permittivity values, the path that has the highest correlation factor is retained, and the others are eliminated.

After this step, the paths are sorted by increasing order of the delay values. If two consecutive paths have substantially equal relative permittivities, only the path with the highest delay is retained, and the others are eliminated.

Following step 108, a final vector is therefore obtained the dimension of which corresponds to the estimated number of layers of the ground and each component of which corresponds to a delay, relative permittivity pair.

Step 109 consists of the final step, which aims to estimate the relative permittivity and thickness of each layer of the ground.

Step 109 firstly consists of calculating an apparent depth between the surface of the ground and the bottom of each successive layer using the following equation:

$$z_k = \frac{c}{\sqrt{\varepsilon_{r_k}}} \tau_k \qquad (5)$$

For each layer of the ground of index k, its apparent depth $z_k$ and the mean relative permittivity $\varepsilon_{r_k}$ of all of the layers between the surface of the ground and the layer of index k are therefore obtained.

In order to obtain the thickness and relative permittivity of each individual layer, the Dix equation is used:

$$v_{int,n} = \sqrt{\frac{t_n v_{g,n}^2 - t_{n-1} v_{g,n-1}^2}{t_n - t_{n-1}}} \qquad (6)$$

$v_{g,n}$ is the mean propagation velocity of the signal from the surface of the ground to the bottom of the layer of index n, $v_{g,n-1}$ is the mean propagation velocity of the signal from the surface of the ground to the bottom of the layer of index n−1, $t_n$ is the return travel time between the surface of the ground and the bottom of the layer of index n, $t_{n-1}$ is the return travel time between the surface of the ground and the bottom of the layer of index n−1, n=1 corresponds to the surface of the ground, $v_{g,n}$, $v_{g,n-1}$ are calculated from equation (2), $v_{int,n}$ corresponds to a mean propagation velocity of the signal inside the layer of index n.

Alternatively, equation (6) can be replaced with equation (7):

$$v_{int,n} = \frac{1}{t_n - t_{n-1}}(t_n v_{g,n} - t_{n-1} v_{g,n-1}) \qquad (7)$$

By applying equation (6) or (7), the value of $v_{int,n}$ is deduced, then the final relative permittivity value of layer n using equation (2), and finally the thickness of the layer with the equation:

$w_n = (t_n - t_{n-1}) \times v_{int,n}$, where $w_n = z_n - z_{n-1}$

If $$t_n v_{g,n}^2 < t_{n-1} v_{g,n-1}^2, v_{int,n}$$

is an imaginary value. In order to eliminate the possibility of obtaining an imaginary value, before the Dix equation is applied, on each iteration, it is checked whether $$t_n v_{g,n}^2 > t_{n-1} v_{g,n-1}^2.$$

If not, only the parameters that give the highest correlation factor are retained, and the others are eliminated.

A second embodiment of the invention will now be described that advantageously applies when the thickness of the first layer is small compared with the time resolution of the radar, which is linked to its carrier frequency.

In such a situation, the return travel time between the surface of the ground and the bottom of the first layer can be considered to coincide with the single direct path of the signal. In this case, the diffraction curve takes a linear form that corresponds to the asymptote of a hyperbola. A linear model is then more appropriate for estimating the paths between the surface of the ground and the interface between the first layer and the second layer.

In this second embodiment of the invention, the method described in FIG. 1 is modified in order to apply certain specific steps solely for estimating the first layer.

Steps 101 to 108 are applied in an identical manner, with the only difference that equation (1) used to calculate the delay t is replaced by the following equation:

$$t = \frac{1}{v_g}\left|x_{Tx_j} + x_{Rx_i} - 2x_{c_p}\right| \qquad (7)$$

Step 109 consists firstly of identifying the path that corresponds most probably to the first layer as being the path that has the highest correlation factor.

Then, the thickness of the first layer is calculated using equation (5).

$$w_1 = \frac{c}{\sqrt{\varepsilon_{r_1}}} \tau_1$$

This path therefore makes it possible to define the relative permittivity $\varepsilon_{r_1}$ and the thickness $w_1$ of the first layer.

Advantageously, the detection threshold used in step 107 for the first layer has a lower value than the threshold used for the upper layers because the model used for the first layer is less accurate.

In one variant of the second embodiment, during the calculation of the properties of the subsequent layers, the correlation coefficient for the path obtained for the first layer on the basis of equation (7) and the correlation coefficient obtained for the first layer on the basis of equation (1) are compared and only the path with the highest correlation coefficient is retained.

In another variant embodiment of the invention, the relative permittivity values obtained for each layer of the ground are interpolated in order to determine a curve showing the change in relative permittivity as a function of the depth of the ground or a probability distribution of the relative permittivity as a function of the depth of the ground.

Figure 3A:
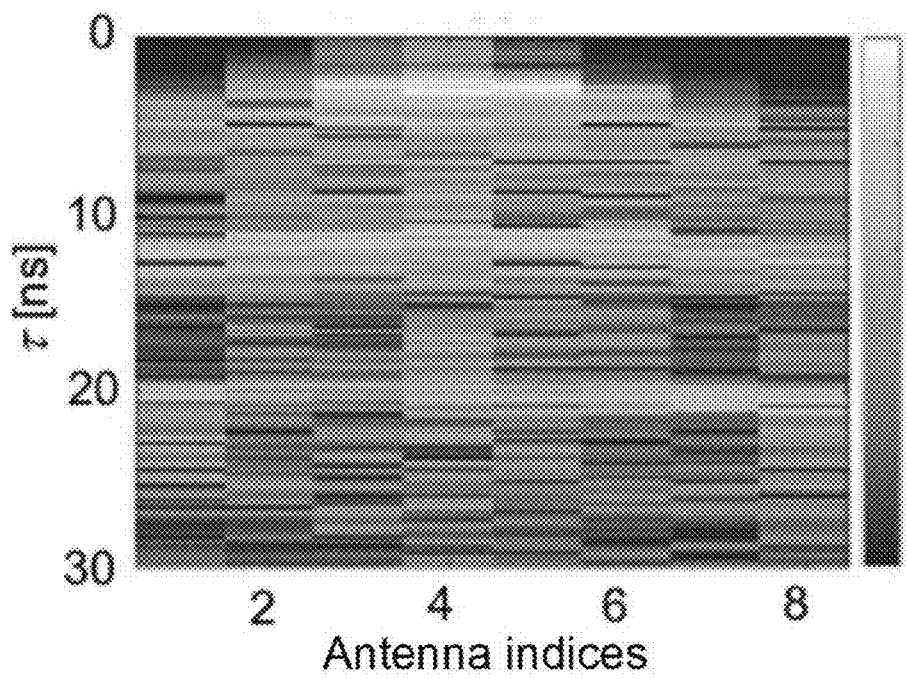
FIG. 3a shows an example of a matrix of impulse responses measured for a transmitting antenna.
Figure 3B:
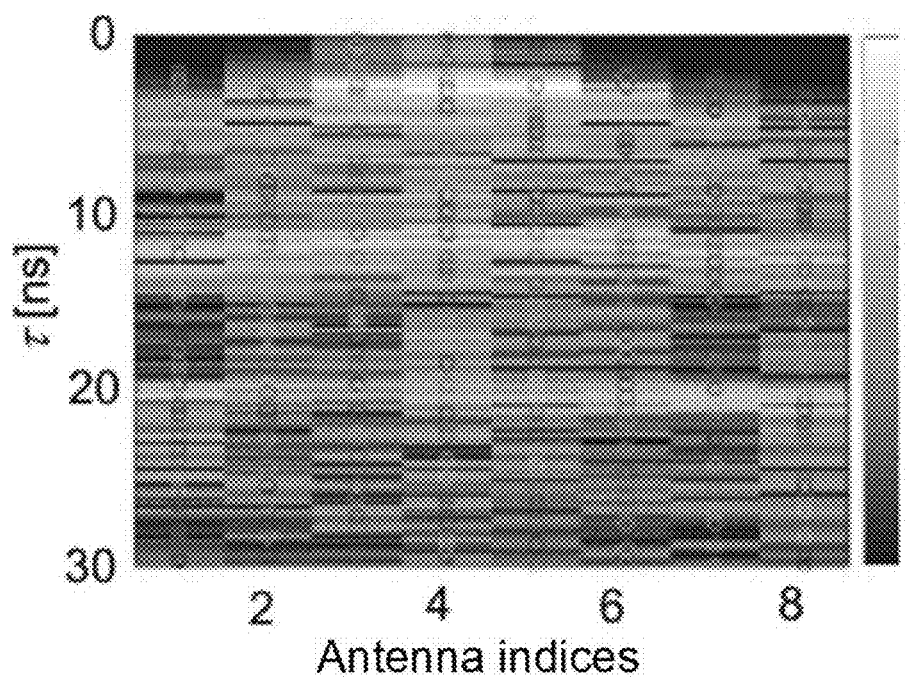
FIG. 3b shows a step of detecting multiple paths in the matrix in FIG. 3a, FIG. 3c shows an example of a correlation matrix according to a step of the method according to the invention.
Figure 3C:
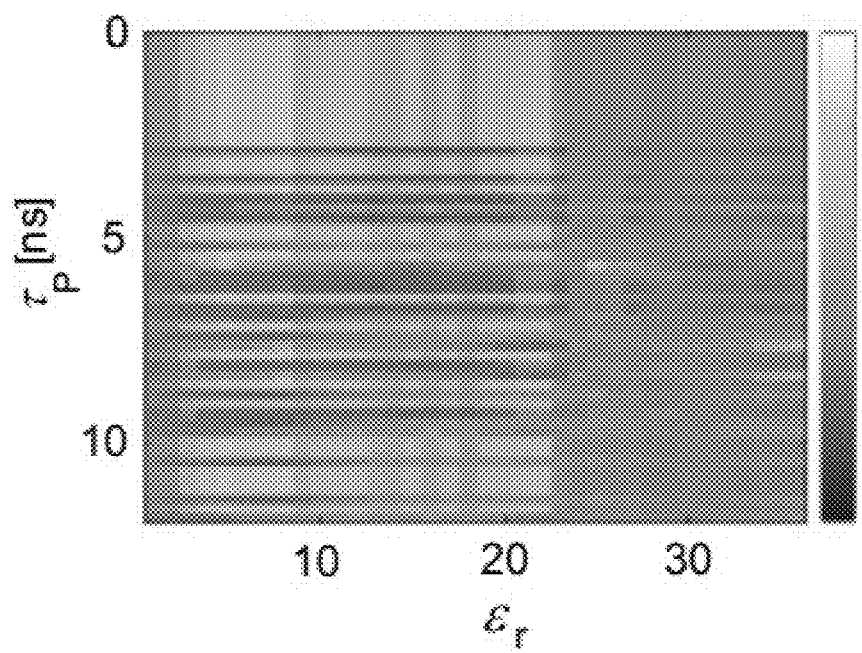

FIGS. 3a, 3b and 3c give examples of outputs of certain intermediate steps of the method according to the invention for a transmitting antenna.

FIG. 3a shows the impulse responses obtained in step 101 for a transmitting antenna in the form of a matrix giving the values of the amplitudes of paths measured for different receiving antennas, with a number of receiving antennas N_Rx equal to 8.

FIG. 3b shows the results obtained following step 102 in the form of circles positioned on the matrix in FIG. 3a in order to identify the multiple paths detected.

FIG. 3c shows an example of a correlation matrix giving the values of the correlation coefficients for each delay and relative permittivity pair.

Figure 4:
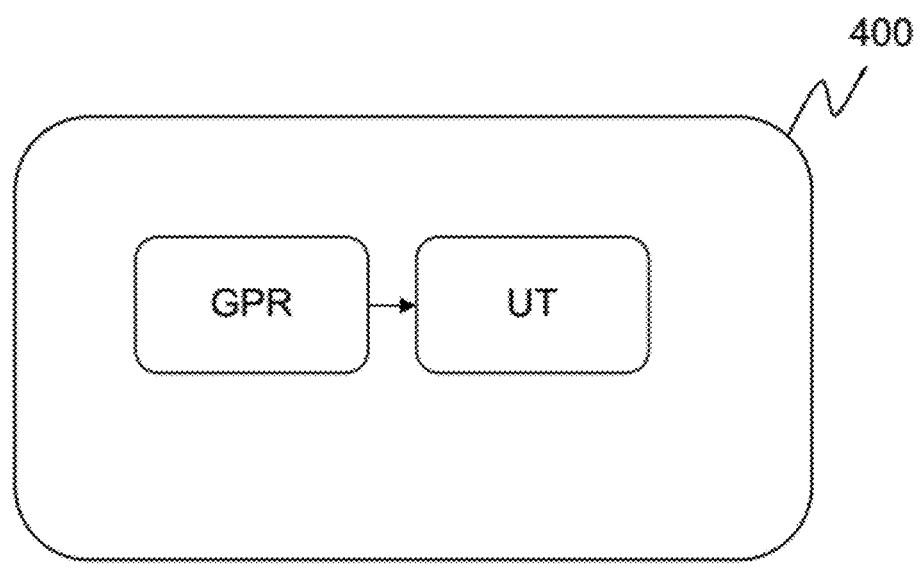
FIG. 4 shows a simplified diagram of a device configured to implement the invention.

FIG. 4 schematically shows a device 400 for determining dielectric properties of the ground according to the invention. The device 400 comprises at least one module GPR for acquiring ground-penetrating radar signals, for example a multi-antenna ground-penetrating radar, and a processing unit UT configured to execute the steps for implementing the invention on the basis of the measurements supplied by the ground-penetrating radar.

The processing unit UT can be produced in software and/or hardware form, in particular by using one or more processors and one or more memories. The processor can be a generic processor, a specific processor, an application-specific integrated circuit (ASIC) or a field-programmable gate array (FPGA).

The invention can be used in conjunction with an algorithm for detecting radar targets according to the prior art. In particular, the invention can be used to detect mines or underground pipes.

REFERENCES

[1] Serkan, S., and V. Borecky. "Estimation methods for obtaining GPR signal velocity." Proceedings of the Third International Conference on ACSEE, Zurich, Switzerland. 2015.
[2] Forte, Emanuele, and Michele Pipan. "Review of multi-offset GPR applications: Data acquisition, processing and analysis." Signal processing 132 (2017): 210-220.
[3] Schneider, William A. "Developments in seismic data processing and analysis (1968-1970)." Geophysics 36.6 (1971): 1043-1073.
[4] Grote, K., S. Hubbard, and Y. Rubin. "GPR monitoring of volumetric water content in soils applied to highway construction and maintenance." The Leading Edge 21.5 (2002): 482-504.
[5] Özdemir, Caner, et al. "A review on migration methods in B-scan ground penetrating radar imaging." Mathematical Problems in Engineering 2014 (2014).
[6] Dong, Zejun, et al. "3D Migration Depth Focus Velocity Analysis of Hand-Held Ground Penetrating Radar." Geosciences 12.4 (2022): 178.
[7] R.-M. Cramer, R. A. Scholtz, and M. Z. Win, "Evaluation of an ultrawide-band propagation channel," IEEE Transactions on Antennas and Propagation, vol. 50, no. 5, pp. 561-570, 2002.
[8] U. Schwarz, "Mathematical-statistical description of the iterative beam removing technique (method clean)," Astronomy and Astrophysics, vol. 65, p. 345, 1978.

The invention claimed is:

1. A method for determining the relative permittivity of a material, comprising the steps:

step 101: acquiring a set of measurements using a ground-penetrating radar provided with NTx transmitting antennas and NRx receiving antennas arranged in a plane parallel to the surface of the material, where NTx and NRx are two positive integers at least equal to two, the set of measurements consisting of impulse responses for each pair consisting of a transmitting antenna and a receiving antenna;

step 102: extracting, from each impulse response, the components relating to multiple paths of the radar signal, in the form of a vector giving the amplitude of the signal as a function of different delay values corresponding to different paths;

step 103: estimating, for each transmitting antenna, a coordinate, in the plane of the radar, of each target associated with a path by finding the coordinate of the receiving antenna that maximizes the impulse response;

step 104: calculating, for a plurality of assumed relative permittivity values of the material, an estimated delay of the radar signal from a hyperbolic curve model defined by the characteristics of the radar and the coordinates of the target associated with a path of the signal;

step 105: finding, in all of the components extracted from the impulse responses, for each pair consisting of a transmitting antenna and a receiving antenna, at least one amplitude associated with a delay closest to the estimated delay calculated in the previous step;

step 106: calculating, for each transmitting antenna, a coefficient of correlation of said amplitudes on all of the receiving antennas;

iterating steps 104 to 106 for a plurality of relative permittivity values of the material;

iterating steps 103 to 106 for all of the delay values corresponding to multiple paths of the radar signal in order to obtain NTx correlation matrices giving, for each relative permittivity of the ground value and delay value pair, a correlation coefficient value;

step 107: eliminating the values of the correlation matrices for which the correlation coefficient is less than a predetermined detection threshold;

step 108: filtering the remaining values so as to retain just one vector containing a set of delay values that are all different and an associated relative permittivity of the ground value;

step 109: deducing therefrom, for each layer of the ground, an estimate of its relative permittivity and thickness.

2. The method for determining the relative permittivity of a material according to claim 1, wherein the step of extracting (102), from each impulse response, the components relating to multiple paths of the radar signal, is carried out using a high-resolution algorithm.

3. The method for determining the relative permittivity of a material according to claim 1, wherein the step of calculating (104) an estimated delay t of the radar signal is carried out using the following hyperbolic equation:

$$t = \frac{1}{v_g}\left[\sqrt{(x_{Tx_j} - x_{c_p})^2 + \left(\frac{\Delta y}{2}\right)^2 + \left(\frac{v_g \tau_p}{2}\right)^2} + \sqrt{(x_{Rx_i} - x_{c_p})^2 + \left(\frac{\Delta y}{2}\right)^2 + \left(\frac{v_g \tau_p}{2}\right)^2}\right]$$

where $x_{c_p}$ is the coordinate of the target estimated in step 103, $x_{Tx_j}$ is the coordinate of each transmitting antenna, $x_{Rx_i}$ is the coordinate of each receiving antenna, $\Delta y$ is the distance between a transmitting antenna and a receiving antenna, $v_g$ is the mean propagation velocity of the signal in the material, and $\tau_p$ is the value of a delay estimated in step 102.

4. The method for determining the relative permittivity of a material according to claim 1, wherein step 105 is carried out by:
- finding, for each pair consisting of a transmitting antenna and a receiving antenna, the amplitude $a_{ip}$ associated with the delay closest to the estimated delay calculated in step 104,
- defining a time window of N+1 samples, N being a positive integer at least equal to 1, the window being centred on the amplitude selected in the previous step, and selecting N/2 amplitude values corresponding to the delay values contained in the time window.

5. The method for determining the relative permittivity of a material according to claim 4, wherein the correlation coefficient is calculated (106) using the following relation:

$$R(t, \varepsilon_R) = \frac{\sum_{p_j=p-N/2}^{p+N/2} \left[ \sum_{i=1}^{NRx} a_{ip_j} \right]^2}{M \sum_{p_j=p-N/2}^{p+N/2} \sum_{i=1}^{NRx} a_{ip_j}^2}$$

where $a_{ip}$ is the amplitude associated with the delay closest to the estimated delay calculated in step 104, p is the index of said delay, $a_{ip_j}$ is the amplitude corresponding to the time index $p_j$ in said time window, and $\varepsilon_r$ is the assumed relative permittivity value.

6. The method for determining the relative permittivity of a material according to claim 1, wherein the threshold value is in the interval ]0.5; 1[.

7. The method for determining the relative permittivity of a material according to claim 1, wherein the step of filtering (108) the remaining values comprises the sub-steps of:
- selecting the pairs that have substantially the same delay values for all of the transmitting antennas,
- ordering the pairs according to the value of the delays,
- when several consecutive relative permittivity values are substantially equal, retaining only the pair having the highest delay value.

8. The method for determining the relative permittivity of a material according to claim 7, wherein, when several pairs have substantially the same delay values for all of the transmitting antennas but different relative permittivity values, only the relative permittivity value that maximizes the correlation coefficient is retained.

9. The method for determining the relative permittivity of a material according to claim 1, wherein the step of deducing (109), for each layer of the material, an estimate of its relative permittivity and thickness comprises the sub-steps of:
- estimating the apparent depth of each layer from each pair of delay and relative permittivity values,
- iteratively determining the relative permittivity of each layer by applying the Dix equation to the delay and propagation velocity values, derived from the relative permittivity value,
- determining the thickness of each layer from the delay and propagation velocity values.

10. The method for determining the relative permittivity of a material according to claim 9, wherein, during the step of iteratively determining the relative permittivity of each layer, when two consecutive paths lead to obtaining an imaginary propagation velocity, the path with the lowest correlation factor of the two paths is eliminated.

11. The method for determining the relative permittivity of a material according to claim 1, wherein the material is multi-layer and the method comprises a prior phase of estimating the relative permittivity of the first layer of the material for which the hyperbolic curve model for the first layer of the material is a linear asymptotic model and the prior phase comprises:
- a step of identifying the path corresponding to the first layer as the path that maximizes the correlation coefficient,
- selecting the relative permittivity associated with said path as corresponding to the first layer,
- calculating the thickness of the first layer from the delay and relative permittivity values associated with the path.

12. The method for determining the relative permittivity of a material according to claim 11, wherein the detection threshold used for the first layer during the prior phase has a lower value than the detection threshold used for the subsequent layers.

13. The method for determining the relative permittivity of a material according to claim 1, wherein the material is the ground.

14. A device for determining the relative permittivity of a material, comprising a ground-penetrating radar provided with NTx transmitting antennas and NRx receiving antennas and a processing unit configured to implement the steps of the method according to claim 1.

15. A computer program comprising code instructions that cause a device for determining the relative permittivity of a material, comprising a ground-penetrating radar provided with NTx transmitting antennas and NRx receiving antennas, and a processing unit, to execute the steps of the method according to claim 1.

16. A computer-readable medium on which the computer program according to claim 15 is stored.

\* \* \* \* \*